No. 654,212. Patented July 24, 1900.
J. T. WILSON.
PISTON VALVE FOR ENGINES.
(Application filed Nov. 9, 1899.)
(No Model.) 2 Sheets—Sheet 1.
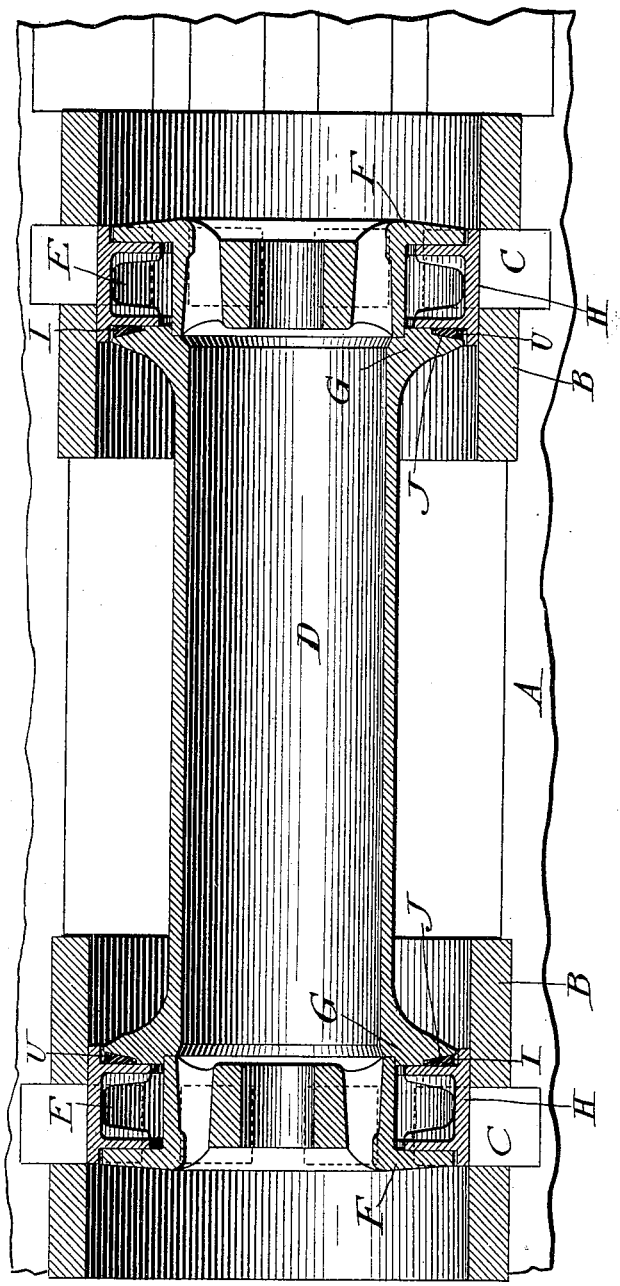
Witnesses:
D. W. Edelin.
C. H. Baker.
Inventor:
John T. Wilson
By F. G. Stebbins
Atty.

No. 654,212. Patented July 24, 1900.
J. T. WILSON.
PISTON VALVE FOR ENGINES.
(Application filed Nov. 9, 1899.)
(No Model.) 2 Sheets—Sheet 2.
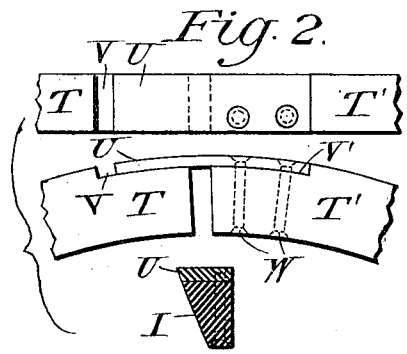
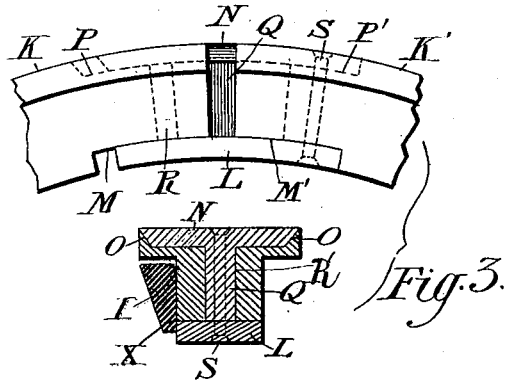
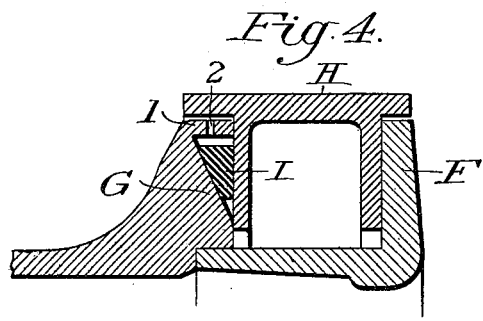
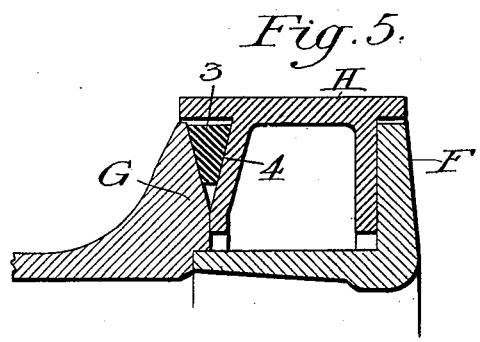
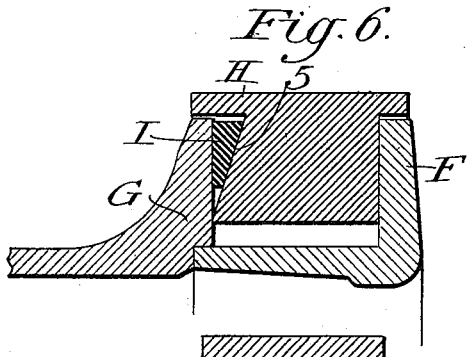
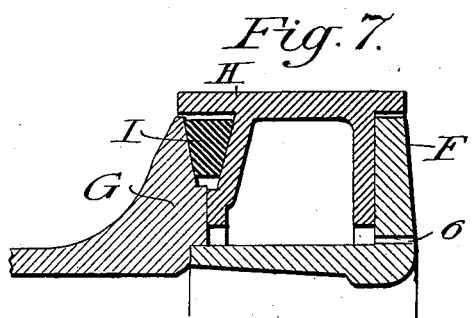
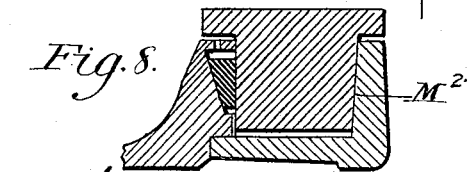
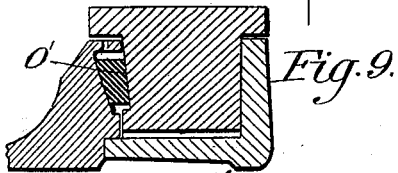
Witnesses
D. W. Edelin.
C. H. Baker.
Inventor
John T. Wilson.
By J. E. Stebbins
Atty.

UNITED STATES PATENT OFFICE.

JOHN T. WILSON, OF JERSEY SHORE, PENNSYLVANIA.

PISTON-VALVE FOR ENGINES.

SPECIFICATION forming part of Letters Patent No. 654,212, dated July 24, 1900.

Application filed November 9, 1899. Serial No. 736,303. (No model.)

*To all whom it may concern:*

Be it known that I, JOHN T. WILSON, a citizen of the United States, residing at Jersey Shore, in the county of Lycoming and State of Pennsylvania, have invented certain new and useful Improvements in Piston-Valve for Engines, of which the following is a specification.

The object of my invention is the production of a piston-valve for locomotive and other engines which shall have the packing-rings so constructed and arranged that when the engine is working steam or other fluid motive power the positions of the rings relative to the bushings will remain substantially unchanged throughout the entire stroke of the piston and the degree of frictional pressure of the outer or circumferential surfaces of the said rings against the inner surfaces of the said bushings be substantially constant, both when the rings are in line with the ports and bridges and when they occupy other positions relative to the bushings; which shall have the said rings so constructed and arranged that when the engine is working steam the rings will be rendered solid or rigid or sufficiently rigid to be unaffected by the pressure of the steam or other motive power upon their outer circumferences when either ring occupies a position in line with the ports at the end of the cut-off; which shall have the said rings so constructed and arranged that live steam cannot come in contact with their inner surfaces and force them outwardly against the bushings and cause excessive friction, especially of the ring against the bridges after the exhaust; which shall have the said rings so constructed and arranged that when the engine is not working steam the rings will automatically adjust themselves to the inner surfaces of the bushings, and thus compensate for wear, and which, finally, shall have the rings so constructed and arranged that they will be durable and efficient, prevent the wiredrawing or blowing of the steam, obviate the necessity of special adjustment by hand, and possess many other desirable features and characteristics.

With the above-enumerated main ends in view my invention consists in certain novelties of construction and combinations and arrangements of parts hereinafter set forth and claimed.

The accompanying drawings illustrate one complete pictured example of the physical embodiment of my invention and six examples of modifications which are constructed according to the best of the several modes I have so far devised for the application of the principle.

Figure 1 is a sectional elevation view of a piston-valve and two bushings, the wall of the casting or cylinder within which the bushings are located being broken away, as shown. Fig. 2 illustrates the constructive details of a lap-joint of a wedge-ring. Fig. 3 illustrates the constructive details of a lap-joint of a packing-ring. Figs. 4, 5, 6, 7, 8, and 9 show fragmentary sectional views of modified forms of the relative arrangement of a packing-ring and a wedge-ring.

Referring to the several figures, the letter A designates the wall of a casting or engine-cylinder.

B B are bushings located within the casting. C designates the steam-ports, (shown in full and dotted lines,) made through the walls of the bushings and separated by bridges.

D is the piston-valve proper.

E E are circular grooves at the ends of the piston-valve and formed in any desirable way.

F F designate the outer circumferential walls of the grooves.

G G are the inner circumferential walls of the grooves; H H, packing-rings made of any suitable material; I I, wedge-rings, also made of any suitable material; J J, the beveled sides of the inner circumferential walls G G of the piston-valve.

K K' are the ends of one of the packing-rings, which are united to form a lap-joint.

L is a bottom plate.

M M' are seats made in the ends of the ring to receive the ends of the bottom plate.

N is a top plate; O, the beveled edge of the top plate.

P P' are seats, also beveled, made in the ends of the ring to receive the ends of the top plate.

Q is a tongue.

R R' are grooves made in the ends of the ring to receive the tongue.

S is a rivet which rigidly unites the top plate and the bottom plate to one end of the ring only.

T T' are the ends of the wedge-ring.

U is a lapping-plate.

V V' are seats made in the ends of the ring to receive the plate, and W W are rivets which unite one end of the plate to one end of the wedge-ring.

The packing-rings are located in the grooves E E of the piston-valve with the ends united by the lap-joints, a sufficient space between the ends proper of each ring being provided to allow the ring within restricted limits to expand and contract. The top plate N, the bottom plate L, and the tongue Q are obviously so disposed relative to the seats and grooves that a tight joint is formed impervious to steam when the ends K K' of the ring are some distance apart.

Each wedge-ring occupies a position in the groove E between the edge of a packing-ring and the beveled surface or side of an inner circumferential wall G of the piston, as shown in Fig. 1. The lap-joint of a packing-ring and the lap-joint of a wedge-ring should of course occupy different positions in the circumference of the groove E and should be held in their relative positions by dowels or other suitable means. It will be observed on reference to Fig. 3 that the lower part of the wedge-ring projects downwardly beyond the line X, which designates the contact-surface of the lower plate L with the seats M M' made in the ends of the packing-ring, thus effectually preventing steam from passing to the under side of the packing-ring at that part of the lap-joint. To prevent wiredrawing or blowing of the steam, I have beveled the edge of the plate N of the lap-joint so that it is in line with the projecting edge of the packing, as shown, that part of the plate which lies adjacent the opening between the ends of the ring presenting a feather-edge and preserving the normal width of the ring at the lap. To provide for the escape of any steam which might find its way into the grooves E E, I may drill holes through the walls F F or provide other passages for its exit to the exhaust sides of the piston.

The operation of the piston-valve when working steam is as follows: Steam being admitted at the center and around the body of the valve when it occupies the position shown in Fig. 1 will come in contact with the top circumferential surface of each wedge-ring and press it downwardly, which action will compress the wedge-ring and force the packing-ring against the outer wall F of the valve. At normal steam-pressure the packing-ring will be rendered solid—even more so than in a plug-valve—and very rigid, and consequently will preserve its shape and its location relative to the bushing and its frictional contact therewith under all conditions. When the valve is moving toward the right and reaches the position shown in Fig. 1 and has cut off steam from the ports at the left, the external surface of the packing-ring will be subjected to great pressure from the steam in the cylinder; but steam pressing upon the wedge-ring will hold the packing-ring rigid and solid to such an extent that it will not collapse or change its form or appreciably vary its frictional contact with the bushing. In fact, whatever position the packing-ring occupies relative to the bushing the frictional contact is substantially constant. When in line with the ports and bridges, it is by reason of its solidity and rigidity practically unaffected by the pressure of steam in the cylinder upon its outer surface. When in a position to one side of the ports and admitting steam or at the opposite side and exhausting steam, it also retains its frictional pressure against the bushing substantially constant, inasmuch as there is no steam-pressure against its inner surface to unbalance it. Steam being shut off, pressure is removed from the wedge-rings, and the packing-rings can then automatically adjust themselves to the inner surfaces of the bushings and compensate for any wear which may have taken place.

From the foregoing it is clear that I have produced a piston-valve which fulfils all the conditions specifically set forth as the main purpose of my invention besides possessing other desirable features and characteristics. The use of piston-valves to distribute steam to the cylinders of engines has heretofore been attended with numerous disadvantages. In the first applications the packing-rings were made narrower than the width of the ports and their use resulted in wearing the bridges below the adjacent surfaces of the bushing. Then the rings were widened to span the ports and bridges. Steam being admitted to the under surface of the wide ring to balance it and prevent its collapse when over the ports resulted in producing an enormous outward frictional pressure of the ring against the bushing at each side of the ports and upon the bridges directly after the exhaust. Consequently the power required to operate the piston increased and the bridges soon became excessively worn. Under all conditions, except when the ring was in line with the ports at the end of the cut-off, the ring was unbalanced, the pressure on the under side being constant and the pressure upon the outer circumference being variable. Now I think my improvements obviate these disadvantages and many others which appertain to similar or analogous types of packing-rings. In my construction steam is not admitted to the under side of the packing-ring at all. The ring is rendered solid and rigid by the wedge-ring when the engine is working steam, so that it preserves its normal position relative to the bushing and a constant pressure against its inner surface throughout the entire stroke. At the end of the cut-off the steam-pressure upon its outer surface is not sufficient to appreciably affect its fractional contact with the bridges, and at the end of the exhaust there is no outward pressure to abnormally force it against the bridges. My valve is thus practically, when steam is on, a plug-valve. When steam is shut off, the pressure is removed from the wedge-ring and the packing-ring can automatically adjust itself to the cylinder—a feature of great importance, inasmuch as it removes the continual decrease in efficiency while wearing and also the necessity of a special adjustment of the ring when it becomes worn. Other advantages of my piston-valve will be suggested to those familiar with the art.

While I have illustrated and described only one complete pictured example of the physical embodiment of my invention, I do not thereby intend to restrict the scope thereof to such example, inasmuch as the principle can be applied by a great variety of modes or methods. Changes in detail of construction may likewise be introduced. I have illustrated several such changes in Figs. 4, 5, 6, 7, 8, and 9. In Fig. 4 a flange 1 may be used, extending entirely around the inner wall G, and be provided with holes 2 for the admission of steam to the wedge-ring. In Fig. 5 the side 4 of the packing-ring is beveled, as well as the side of the inner wall, to provide for the use of a wedge-ring 3, having both sides beveled, whereby greater rigidity can be imparted to the packing-ring. In Fig. 6 the packing-ring only is beveled to form a seat for the wedge-ring 5. In Fig. 7 is shown a hole 6, drilled through the outer wall F, so that any steam which may find its way under the rings can pass to the exhaust side of the piston. In Fig. 8 the wall $M^2$, which lies in contact with the packing-ring, is beveled and not perpendicular, as in other examples. The object of this construction is to insure the stability of the packing-ring when subjected to pressure from the cylinder, the ring here acting like a wedge. In Fig. 9 the bevel is made in the side of the packing-ring at O' for the same purpose.

In constructions where the live steam may be admitted at the ends of the piston-valve and exhausted about the body thereof at the center the location of the wedge-rings would of course be changed to the opposite sides of the packing-rings, so as to lie against the outer walls of the grooves. When different degrees of rigidity are to be imparted to the packing-rings, the dimensions and the shape of the wedge-ring will obviously be changed to secure the desired result. Separate bushings are, moreover, not essential elements, as is evident. These and many other changes and modifications and alterations may be introduced at will in applying the principle of the invention without constituting a substantial departure.

What I claim is—

1. A piston-valve having packing-rings and wedge-rings located in grooves at the ends of the valve and so disposed that steam is normally excluded from the under sides of the packing-rings; each of the said wedge-rings adapted, when subjected to steam-pressure, to force a packing-ring against a wall of the groove in which it is located; in substance as set forth.

2. A piston-valve having grooves at the ends, and a packing-ring and a wedge-ring located in each groove, and so combined as to prevent the admission of steam to the under surface of the packing-ring; in substance as set forth.

3. A piston-valve having grooves at the ends and a packing-ring and a wedge-ring located in each groove, and so combined as to normally prevent the admission of steam to the under side of the packing-ring; said piston being provided with passages for the discharge to the exhaust sides of the piston of any live steam which may by accident gain access to the under side of the packing-rings; in substance as set forth.

4. The combination with a piston-valve having grooves, of packing-rings having lap-joints, and wedge-rings having lap-joints; a packing-ring and a wedge-ring being located in each groove; in substance as set forth.

5. The combination with a piston-valve having grooves, of packing-rings having lap-joints, and wedge-rings having lap-joints; a packing-ring and a wedge-ring being located in each groove and the said lap-joints being located in different positions within the circumference of the groove; in substance as set forth.

6. The combination with a piston-valve, of a packing-ring and a wedge-ring both located side by side in a groove, the wedge-ring adapted to receive the pressure of steam upon its outer circumferential surface and to force the packing-ring against a wall of the groove in substance as set forth.

7. The combination with a piston or piston-valve, of a packing-ring and a wedge-ring located side by side in a groove; said wedge-ring having a lap-joint and both rings so arranged as to exclude steam from the under side of the packing-ring; in substance as set forth.

8. The combination with a piston-valve, of a packing-ring and a wedge-ring located side by side in a groove; said packing-ring having a lap-joint and both rings so arranged as to exclude steam from the under side of the packing-ring; in substance as set forth.

9. The combination with a piston-valve, of a packing-ring and a wedge-ring; said packing-ring having free ends and provided with a top plate, a bottom plate, and a tongue; in substance as set forth.

10. The combination with a piston-valve, of a packing-ring and a wedge-ring; said packing-ring having free ends united by a lap-joint and a plate provided with a beveled edge; in substance as set forth.

11. The combination with a piston-valve, of a packing-ring having a lap-joint and a wedge-ring; the said wedge-ring being so located relative to the packing-ring that it will cover the joint between the plate, L, and the packing-ring; in substance as set forth.

12. The combination with a piston-valve having grooves at the ends and inner and outer walls, of packing-rings and wedge-rings; the sides of two of the walls being cut away or beveled to form seats for the wedge-ring; in substance as set forth.

13. The combination with a piston or piston-valve, of a packing-ring and a wedge-ring; the said rings being so disposed that, when steam is on, it will be excluded from the under side of the packing-ring, but press upon the wedge-ring; in substance as set forth.

14. The combination with a piston or piston-valve, of a packing-ring and a wedge-ring, the said rings being so disposed that, when steam is on, the wedge-ring will be forced against the packing-ring and hold it rigid against a wall of the piston; in substance as set forth.

15. The combination with a piston-valve, of a packing-ring having a lap-joint, and a wedge-ring having a lap-joint, the parts being so combined that, when steam is on, the wedge-ring will bind or clamp the packing-ring and hold it rigid and that, when steam is shut off, the packing-ring can automatically adjust itself to take up wear; in substance as set forth.

16. The combination with a piston-valve, of a packing-ring, and a wedge-ring; the body of the packing-ring, between the wall and the wedge-ring being slightly tapered; whereby when a wide packing-ring is used and subjected to high pressure from the cylinder at the close of the steam cut-off the said ring cannot collapse; in substance as set forth.

17. The combination with an engine-cylinder having a port or ports, of a piston-valve having packing-rings and wedge-rings, steam being excluded from the under side of the packing-rings, and the wedge-rings holding the said packing-rings rigid; whereby the friction between the surfaces of the packing-rings and the cylinder will be rendered substantially constant at all points in the traverse of the valve both opposite and each side of the port or ports.

In testimony whereof I affix my signature in presence of two witnesses.

JOHN T. WILSON.

Witnesses:
  FRANK TRUMP,
  WM. R. PEOPLES.